J. S. TAYLOR.
COMBINED BEVEL AND SQUARE.
APPLICATION FILED AUG. 26, 1908.
935,067.
Patented Sept. 28, 1909.
2 SHEETS—SHEET 1.
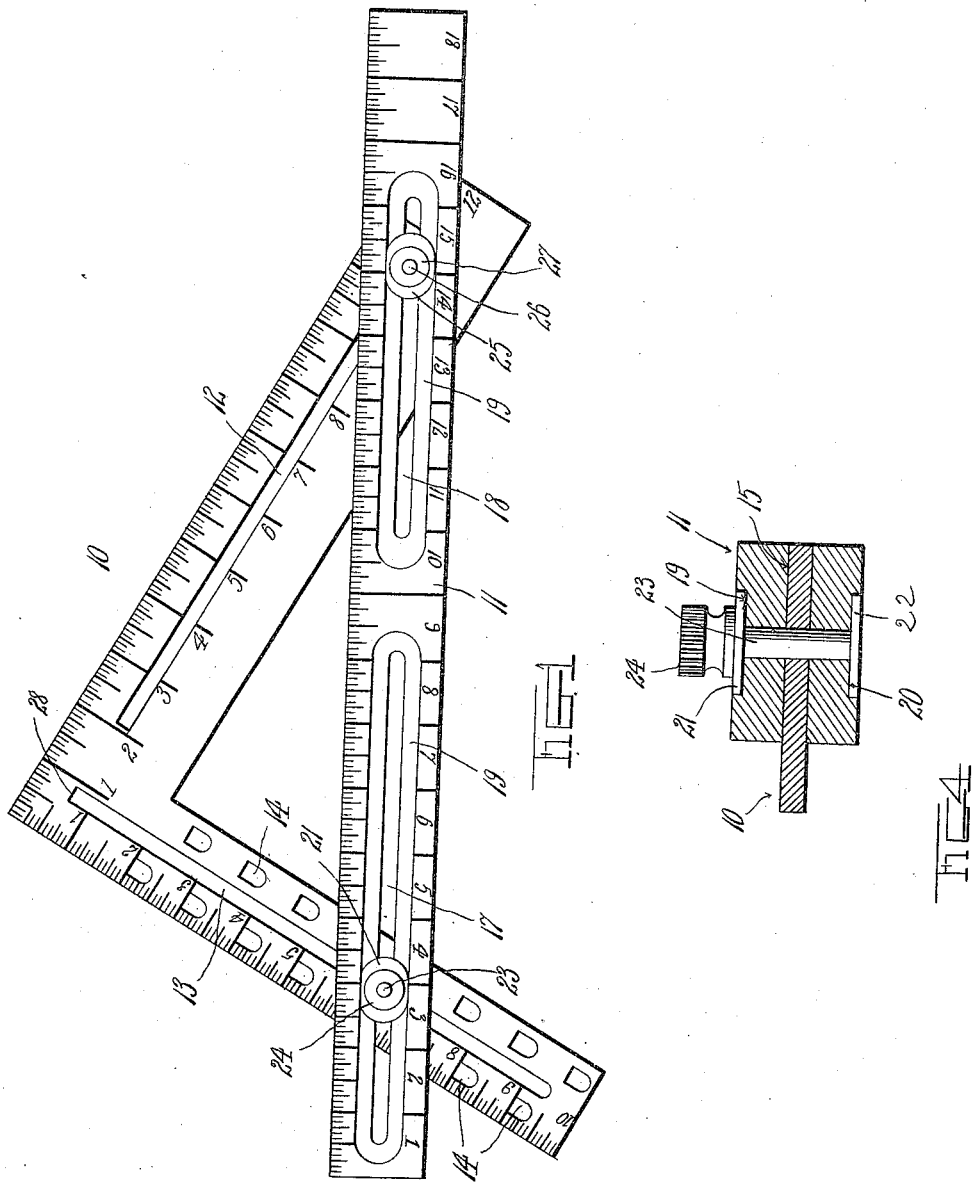
Witnesses
J. H. Crawford
C. H. Woodward
Inventor
John S. Taylor
By Chandler Chandler
Attorney J. S. TAYLOR.
COMBINED BEVEL AND SQUARE.
APPLICATION FILED AUG. 26, 1908.
935,067.
Patented Sept. 28, 1909.
2 SHEETS—SHEET 2.
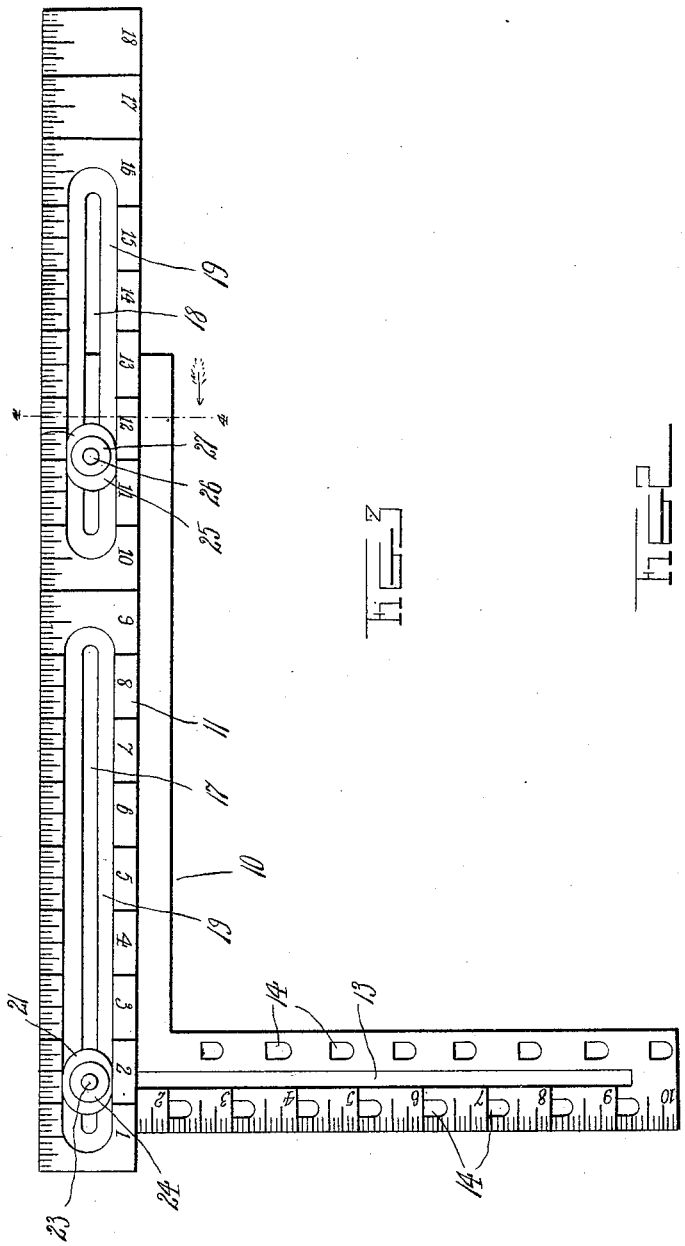
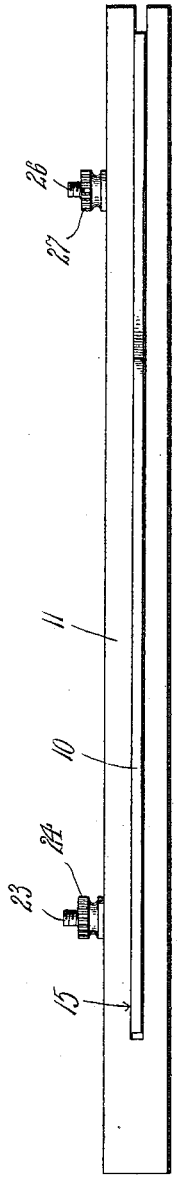
Witnesses
J. H. Crawford
C. N. Woodward
Inventor
John S. Taylor,
By
Attorneys

UNITED STATES PATENT OFFICE.

JOHN S. TAYLOR, OF SCOTTSBURG, INDIANA, ASSIGNOR OF ONE-HALF TO LEANDER B. STEWART, OF SCOTTSBURG, INDIANA.

COMBINED BEVEL AND SQUARE.

935,067.

Specification of Letters Patent.   Patented Sept. 28, 1909.

Application filed August 26, 1908.   Serial No. 450,304.

*To all whom it may concern:*

Be it known that I, JOHN S. TAYLOR, a citizen of the United States, residing at Scottsburg, in the county of Scott, State of Indiana, have invented certain new and useful Improvements in Combined Bevels and Squares; and I do hereby declare the following to be a full, clear, and exact description of the invention, such as will enable others skilled in the art to which it appertains to make and use the same.

This invention relates to squares employed by carpenters and like artisans, and has for one of its objects to provide an implement of this kind with an attachment whereby angles may be produced to assist in "laying out" work such as roofing timbers, braces, and the like, and which may also be employed for defining the outlines of mortises, tenons, and the like.

With these and other objects in view the invention consists in a graduated square having a longitudinal slot in its "blade" and a longitudinal slot in its "tongue", a divided bar bearing upon opposite sides of the members of the square and graduated to correspond to the graduations of the square and with longitudinal slots, and clamp screws operating through the slots of the bar and likewise through the slots of the square.

The invention further consists in certain novel features of construction as hereafter shown and described and then specifically pointed out in the claims, and in the drawings illustrating the preferred embodiment of the invention, Figure 1 is a plan view of the improved device arranged as a bevel, or to produce angles. Fig. 2 is a side elevation of the same. Fig. 3 is a plan view of the improved device arranged for use as a try-square, or as a scribing gage. Fig. 4 is a section enlarged on the line 4—4 of Fig. 3.

The improved device comprises two main portions, a square of the form usually known as carpenters' squares and represented as a whole at 10 and preferably with graduations in twelfths of an inch and a divided bar represented as a whole at 11.

The square is provided with a longitudinal slot 12 in its "blade" portion and a like longitudinal slot 13 in its "tongue" portion, the tongue portion also having a plurality of apertures 14 in alinement with the graduations, the apertures designed to receive a pencil or scribing implement when the device is employed as a gage, as hereafter explained.

The bar 11 is divided by a transverse longitudinal slot 15 open at one end and closed at the other end, and likewise provided with spaced longitudinal slots 17—18 communicating through the cleft or split 15, and likewise communicating respectively with the slots 12—13 of the square.

The blade portions of carpenters' squares are wider than the tongue portions, and in the drawings this proportion is retained and the slot 12 of the blade portion is shown nearest to the outer edge, to enable the device to be employed as a "try-square" as hereafter explained.

Longitudinal recesses are formed in the outer faces of the bar 11 whereby shoulders 19—20 are formed surrounding the slots.

Bearing upon the shoulders 19—20 are clamp plates 21—22, and coupling these clamp plates is a clamp screw 23 having a milled nut 24, the clamp screw extending through the slot 13 of the square. Bearing upon the shoulders 20 are similar clamp plates one of which is shown at 25 and connected by a clamp bolt 26 and provided with a milled nut 27, the clamp bolt 26 extending through the slot 18 and likewise through the slot 12 of the square. By this simple means it will be obvious that the bar 11 may be adjusted to any desired angle across the two members of the square, and by adjusting the graduations of the bar to correspond to certain graduations of the square, any required angle may be obtained, and any required pitch or angle thereby scribed upon the timber or other body. The graduations of the square and of the bar being each one-twelfth of an inch, so that the total dimensions of the material on which the implement is employed may be readily ascertained by "reading" the graduations on the bar and on the square, as will be obvious.

By reference to Fig. 1 it will be noted that the terminal 28 of the slot 13 is in alinement with the outer edge of the slot 12, so that when the clamp screws are released the bar may be disposed parallel to the blade portion of the square as the clamp screw 23 will assume a position against the end 28, and thus permit this adjustment.

The bar 11, it will be noted, is of less width than the blade portion 10 of the square, so that when the bar is arranged upon the blade 10, as shown in Fig. 3, the inner portion of the blade extends inwardly from the bar and thus forms a support for bearing upon the work, the bar serving the same purpose as the head portion of a try square. The outer edge of the member 11 when it is arranged as shown in Fig. 3, it will be noted comes flush with the outer edge of the blade 10, so that the graduations on the outer edge of the member 11 can be accurately utilized in taking measurements. When thus disposed the implement is in position to be employed as a try-square or a scribing implement for assisting in laying out mortises and tenons, and the like. When employed for this purpose the square is laid upon the outer edge of the work with one side of the bar bearing against the outer face of the work in the same manner as an ordinary try-square is employed, and one of the apertures 14 utilized to receive a pencil or an awl or other scribing implement and by drawing the square together with the bar along the edge of the work a line will be scribed thereon, as will be obvious.

The apertures 14 are disposed in staggering relations or with an aperture opposite each half inch of the scale so that if the apertures are employed to hold the scribing implement lines one-half an inch apart may be drawn upon the work, and if intermediate lines are required they can readily be scribed by holding the pencil in position opposite any desired graduation.

The improved implement is simple in construction, can be inexpensively manufactured and will be found very useful for carpenters, builders, and others requiring an implement of this character.

What is claimed, is:—

1. An implement of the class described comprising a square formed with a relatively large graduated blade and a relatively narrow graduated tongue, the blade and the tongue each having a graduated slot, the slot in the blade being located relatively near its outer edge, a divided bar bearing upon opposite sides of said blade and its tongue and of less width than the blade and with spaced longitudinal slots, clamp screws operating through said slots, whereby when the bar is clamped to the blade in parallel relations thereto, a portion of the blade projects inwardly therefrom and the outer edge of the divided member comes flush with the outer edge of the blade.

2. An implement of the class described comprising a square formed with a relatively wide graduated blade and a relatively narrow graduated tongue, the blade and tongue each provided with a longitudinal slot, the slot in the blade being located relatively near the outer edge, a divided bar bearing upon opposite sides of said blade and tongue and of less width than the blade and with spaced longitudinal slots, said bar having depressions extending longitudinally of the bar and surrounding the slots, clamp plates bearing upon the shoulders formed by the depressions and within the same, and the clamp screws operating through said clamp plates and through said slots.

In testimony whereof, I affix my signature, in presence of two witnesses.

JOHN S. TAYLOR.

Witnesses:
H. CECIL WOLFF,
ARCHIBALD SHIELDS.